L. W. RICHARDSON.
Wheel-Plows.

No. 141,951.     Patented August 19, 1873.

Witnesses:     Inventor:

UNITED STATES PATENT OFFICE.

LIONEL W. RICHARDSON, OF ROSCOE, ILLINOIS.

IMPROVEMENT IN WHEEL-PLOWS.

Specification forming part of Letters Patent No. 141,951, dated August 19, 1873; application filed May 31, 1873.

*To all whom it may concern:*

Figure 1:
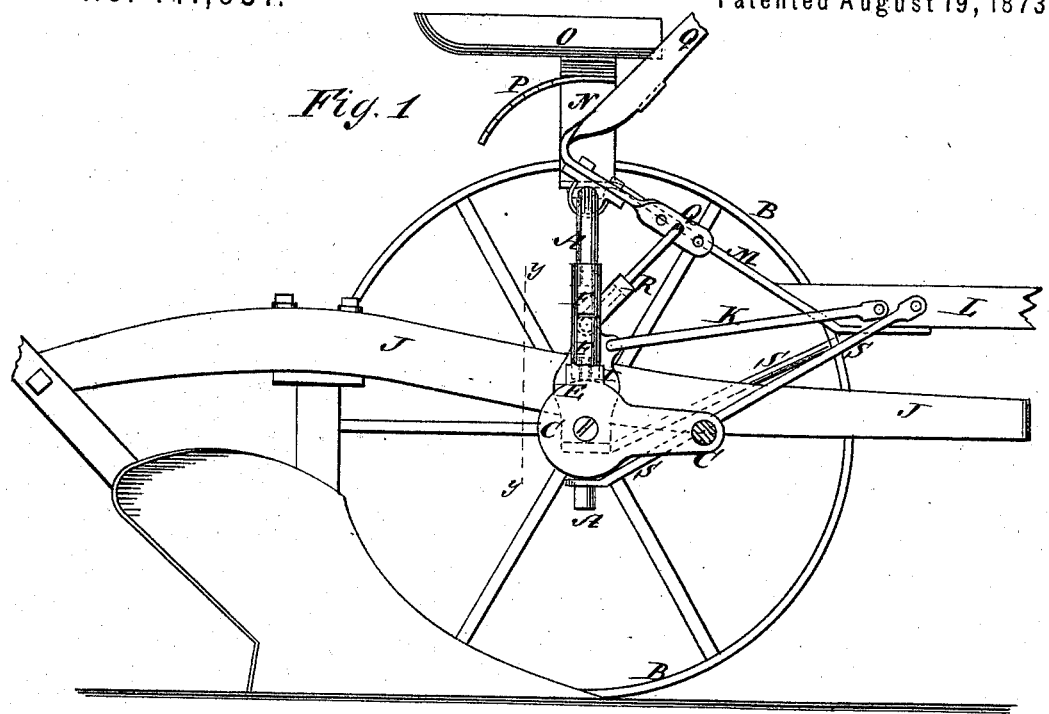
Figure 2:
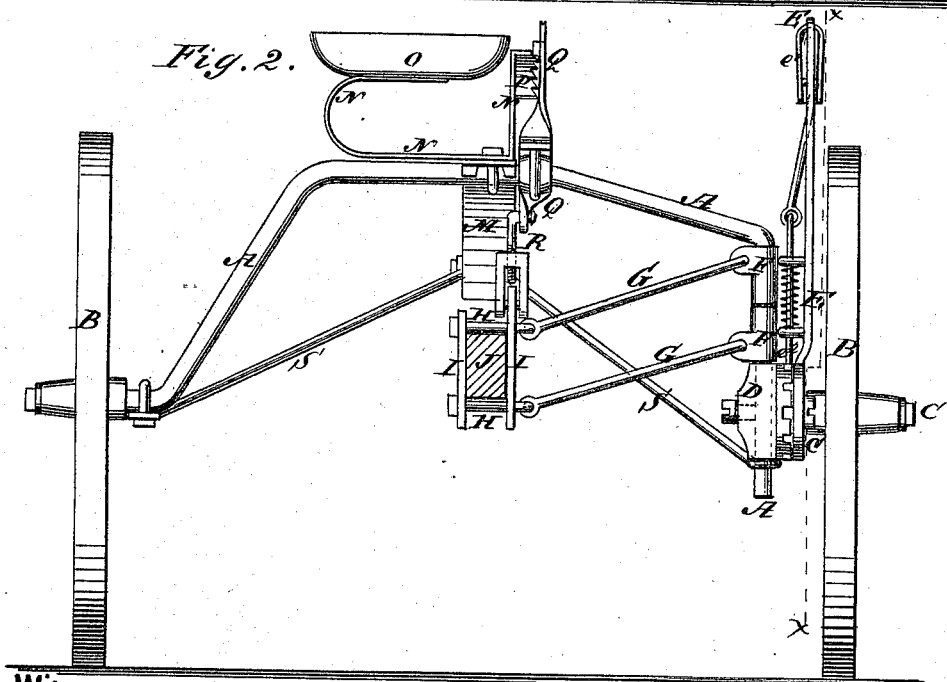

Be it known that I, LIONEL W. RICHARDSON, of Roscoe, in the county of Winnebago and State of Illinois, have invented a new and useful Improvement in Sulky Attachment for Plows, of which the following is a specification:

Figure 1 is a side view of my improved device taken through the line $x\ x$, Fig. 2. Fig. 2 is a rear view of the same, the plow-beam being shown in section through the line $y\ y$, Fig. 1.

My invention has for its object to furnish an improved sulky attachment for plows, which shall be simple in construction, readily adjusted and manipulated, conveniently attached to the beam of an ordinary plow, and which will allow the plow to have the necessary freedom of motion vertically and laterally. The invention consists in the combination of the sleeves, the pivoted rods, the clamp, and the draft-rod with the arched or bent axle and the plow-beam; in the combination of the bent lever and the swivel connecting-rod with the arched or bent axle, the clamp, the pivoted connecting-rods, and the sleeves, as hereinafter fully described.

A is the axle, which is arched or bent in about the form shown in Fig. 2. B are the wheels, one of which works upon a journal formed upon the land-side end of the axle A. The other wheel B works upon a crank-axle, C, pivoted to the lower vertical part of the plowed-land end of the axle A, or to a head-block, D, secured to said axle A. To the crank-axle C is rigidly attached a lever, E, by means of which the said crank-axle C may be adjusted so that its wheel may run in a furrow or upon the surface of the ground, and have the frame of the machine at all times horizontal. The lever E is provided with a hand-lever, $e^1$, and a spring-pawl, $e^2$, to take hold of the head-block D and hold the crank-axle C securely in any position in which it may be adjusted. Upon the vertical part of the axle A, above the head-block D, are placed two sleeves, F, to which are pivoted the outer ends of two rods, G, the inner ends of which are pivoted to the eyebolts H, which pass through the upper and lower parts of the plates I, which are placed upon the opposite sides of the blow-beam J, and which, in connection with the eyebolts H, form a clamp for holding the said plow-beam. K is the draft-rod, the rear end of which is pivoted to one of the plates I, and its forward end is pivoted to the side of the tongue L. To the rear end of the tongue L is attached a bar or plate, M, which inclines upward, and its rear end is attached to the upper part of the axle A. To the upper part of the axle A is secured, by the same bolts that secure the bar M, a spring, N. One end of the spring N is bent upward and inward, and to it is attached the driver's seat O. The other end of the spring N is bent upward, and to it is attached a ratchet-bar, P, the teeth of which take hold of the long arm of the bent lever Q to hold it securely in place when adjusted. The lever Q is pivoted to the axle A, and to its short arm is pivoted the upper end of a swivel connecting-rod, R, the other end of which is pivoted to one of the plates I. Several holes are formed in the short arm of the lever Q to receive the end of the swivel-rod R, so that it may be adjusted to raise the plow more or less, as may be desired.

By this construction the plow has a free vertical and horizontal movement, and by adjusting the lever Q the plow may be raised away from the ground, or adjusted to work at any desired depth in the ground.

The bent or arched axle A is strengthened against the draft-strain by the braces S, the rear ends of which are attached to said axle near its ends, and the forward ends of which are attached to the opposite sides of the rear part of the tongue L.

Having thus described my invention, I claim as new and desire to secure by Letters Patent—

1. The combination of the sleeves F, pivoted rods G, clamp H I, and draft-rod K, with the arched or bent axle A and plow-beam J, substantially as herein shown and described.

2. The combination of the bent lever Q and swivel connecting-rod R with the arched or bent axle A, and the clamp H I, pivoted connecting-rods G, and sleeves F, substantially as herein shown and described.

LIONEL W. RICHARDSON.

Witnesses:
A. A. NEEDHAM,
ASA HALL.